(12) United States Patent
Urban et al.

(10) Patent No.: US 9,876,578 B2
(45) Date of Patent: Jan. 23, 2018

(54) OPTICAL DEVICE, AN OPTICAL TRANSCEIVER AND A NETWORK NODE

(71) Applicant: TELEFONAKTIEBOLAGET LM ERICSSON (PUBL), Stockholm (SE)

(72) Inventors: Patryk Urban, Vällingby (SE); Boris Dortschy, Hägersten (SE); Luca Giorgi, Ponsacco (IT); Filippo Ponzini, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/319,560

(22) PCT Filed: Jun. 19, 2014

(86) PCT No.: PCT/SE2014/050763
§ 371 (c)(1),
(2) Date: Dec. 16, 2016

(87) PCT Pub. No.: WO2015/195016
PCT Pub. Date: Dec. 23, 2015

(65) Prior Publication Data
US 2017/0149509 A1      May 25, 2017

(51) Int. Cl.
*H04B 10/516*      (2013.01)
*G02B 6/293*      (2006.01)
(Continued)

(52) U.S. Cl.
CPC ..... *H04B 10/5165* (2013.01); *G02B 6/29319* (2013.01); *H04B 10/25752* (2013.01); *H04J 14/0227* (2013.01)

(58) Field of Classification Search
CPC ........... H04B 10/5165; H04B 10/25752; H04J 14/0227; G02B 6/29319
See application file for complete search history.

(56) References Cited

U.S. PATENT DOCUMENTS 6,317,539 B1     11/2001   Loh et al.
2006/0159458 A1    7/2006   Kagawa
(Continued)

FOREIGN PATENT DOCUMENTS

EP     1341012 A2      9/2002
WO     2014137256 A1   9/2014
WO     2015154806 A1  10/2015

OTHER PUBLICATIONS

Lim, et al., Investigation of Intermodulation Distortion Reduction Technique for Multi-Channel Fiber-Radio Transmission in Heterogeneous Access Networks, 19th Annual Meeting of the IEEE Lasers and Electro-Optics Society, LEOS 2006.
(Continued)

*Primary Examiner* — Shi K Li
*Assistant Examiner* — Mina Shalaby

(57) ABSTRACT

An optical device comprising, an optical input and output device comprising a first input port, a second input port, a first output port and a second output port, and an optical filtering device comprising an input port coupled to the first output port and an output port coupled to the second input port, and an optical amplifying device comprising an input port coupled to the second output port. The optical input and output device is adapted to couple the output port comprised in the optical filtering device to the input port comprised in the optical amplifying device. The optical filtering device comprises a multiple of cascaded phase shifted Bragg gratings, each being adapted to filter an associated respective optical carrier within to produce a respective output signal to the optical amplifying device.

15 Claims, 3 Drawing Sheets

(51) Int. Cl.
*H04B 10/2575* (2013.01)
*H04J 14/02* (2006.01)

(56) References Cited

U.S. PATENT DOCUMENTS

| | | | | |
|---|---|---|---|---|
| 2009/0324249 A1* | 12/2009 | Zhang | ................. | H04B 10/035 |
| | | | | 398/177 |
| 2010/0111540 A1* | 5/2010 | Caplan | ................ | H04B 10/677 |
| | | | | 398/140 |
| 2010/0278535 A1* | 11/2010 | Kim | .................... | H04B 10/272 |
| | | | | 398/72 |
| 2013/0163915 A1* | 6/2013 | Lee | ........................ | G02B 6/001 |
| | | | | 385/12 |
| 2013/0279900 A1* | 10/2013 | Kim | ................... | H04J 14/0247 |
| | | | | 398/3 |

OTHER PUBLICATIONS

Cox, III, et al., Limits on the Performance of RF-Over-Fiber Links and Their Impact on Device Design, IEEE Transactions on Microwave Theory and Techniques, vol. 54, No. 2, Feb. 2006.

Xu, et al., Performance Improvement in RoF Links Based on Optical Carrier Suppression using a Phase-Shifted FBG, Proc. ACP/ICOP 2013.

Fink, et al., Ultrasonic Detection Using π-Phase-Shifted Fiber Bragg Gratings, Master Thesis, University of Nebraska-Lincoln, Nov. 2012.

Phase shifted FBG, http://www.aos-fiber.com/eng/FBG/Pshiften.html.

Zaman, et al., Integrated Optical Circulator in InP, Conference on Lasers and Electro-Optics (CLEO), paper CWF3, 2005.

* cited by examiner

OPTICAL DEVICE, AN OPTICAL TRANSCEIVER AND A NETWORK NODE

This application is a 371 of International Application No. PCT/SE2014/050763, filed Jun. 19, 2014, the disclosure of which is fully incorporated herein by reference.

TECHNICAL FIELD

Embodiments herein relate to an optical device, an optical transceiver and a network node. In particular, they relate to filtering and amplifying wavelength division multiplexed signals in communication networks.

BACKGROUND

Radio over fiber (RoF) refers to a technology whereby Radio Frequency (RF) signals are modulated on an optical carrier and transmitted over an optical fiber link. In other words, radio signals are carried over fiber-optic cable. The RF signals may be wireless RF signals.

With RoF technology an optical network may be used to federate several radio antennas thanks to the large bandwidth offered by the optical fiber link and its low loss. RoF may be deployed in many modern radio systems, such as 3rd Generation Partnership Project (3GPP) Universal Mobile Telecommunications System (UMTS) or 3GPP Long Term Evolution (LTE).

A fronthaul link is the link between a base station baseband unit or base station digital unit to a remote radio head and antenna. In other words, the fronthaul link is the link between the baseband or digital unit of a base station, usually in a centralized location, to a remote radio head and antenna. RoF may reduce latency and simplify radio head complexity, e.g. by moving Analogue-to-Digital Converters (ADC) and Digital-to-Analogue Converters (DAC) closer to the baseband unit, in fronthaul.

However, RoF in fronthaul suffers from cumulative effects of noise and nonlinearities of optical devices as well as crosstalk arising from impairments in the optical fiber link.

Within a point-to-point fiber link connecting the remote radio head and antenna and a central office, comprising the baseband unit, received wireless RF signals undergo electrical-to-optical conversion via a directly modulated laser or an external modulation, e.g. using an electro-optic modulator in conjunction with an optical carrier.

As a drawback, in RoF, the overall system performance of the optical network is limited by the performance of the optical subsystems of the optical network, such as the directly modulated laser. This is primarily due to a nonlinear transfer function of the electro-optical modulator or the directly modulated laser used in the transceiver.

SUMMARY

It is therefore an object of embodiments hereinto provide an improved performance of a communications network.

According to a first aspect of embodiments herein, the object is achieved by an optical device for filtering and amplifying a multiple of Wavelength Division Multiplexed, WDM, signals in an optical transmission link in a communications network. Each WDM signal comprises a respective optical carrier and a respective modulation signal.

The optical device comprises an optical input and output device. The optical input and output device comprises a first input port to input the WDM signals from the optical transmission link into the optical device and further comprises a second input port, a first output port and a second output port. The first input port is coupled to the first output port, and the second input port is coupled to the second output port.

The optical device further comprises an optical filtering device. The optical filtering device comprises an input port coupled to the first output port comprised in the optical input and output device to input the WDM signals, and an output port coupled to the second input port comprised in the optical input and output device.

The optical device further comprises an optical amplifying device comprising an input port coupled to the second output port comprised in the optical input and output device.

The optical filtering device comprises a multiple of cascaded phase shifted Bragg gratings. Each Bragg grating is adapted to filter an associated respective optical carrier, from the respective WDM signal to produce a respective output signal to the optical amplifying device. For each respective output signal the respective optical carrier is suppressed relative to the respective modulation signal.

Thereby, the optical device is adapted to receive the multiple of WDM signals, to filter the associated respective optical carrier from the WDM signals, and to amplify the respective output signal with suppressed optical carrier, such that the Spurious Free Dynamic Range (SFDR) and the link gain associated with the respective output signal is improved compared with the SFDR and the link gain associated the WDM signals as inputted from the optical transmission link. This in turn improves the performance of the optical transmission link and thus improves the performance of the communications network.

An advantage of embodiments herein is that the multiple of cascaded phase shifted Bragg gratings enable very precise notch filtering of the WDM signals.

Another advantage of embodiments herein is that one optical device may be used for several WDM signals.

Another advantage with embodiments herein is that the level of backscattered or back-reflected WDM signals, e.g. from the optical transmission link, is low, since the amplification of the WDM signal is performed after the optical transmission link, e.g. in front of one or more photodetectors in a receiver.

A further advantage with embodiments herein is that one optical filtering device is able to provide carrier suppression, extraction of synchronization signal and reuse of the optical carrier. Further, the optical filtering device may be an integrated optical device providing advantages in size, complexity and cost.

Another advantage with embodiments herein is that one common optical amplifier is shared between all the WDM channels, which is advantageous for reasons of size, complexity and cost.

Yet another advantage with embodiments herein is that they may also be adapted to act as a gain-flattened optical filter to secure negligible or no signal distortion in the optical amplifying device. Such signal distortion results from interaction in the optical amplifying device between optical channels that are unequal in power.

BRIEF DESCRIPTION OF THE DRAWINGS

Examples of embodiments herein are described in more detail with reference to attached drawings in which.

DETAILED DESCRIPTION

Figure 1:
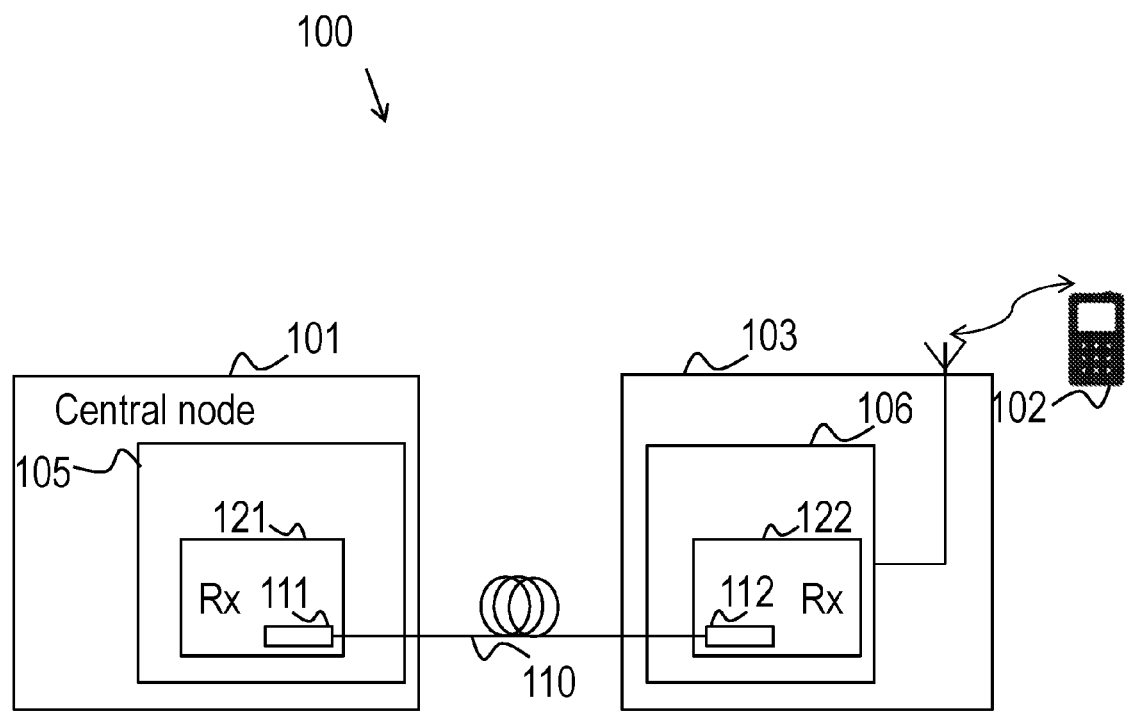
FIG. 1 is a schematic block diagram illustrating a communications network and embodiments herein.

As part of developing embodiments herein, a problem will first be identified and discussed.

The most used techniques for RoF transmission rely on digital domain techniques, e.g. the Common Public Radio Interface (CPRI). However, using analog RoF makes it possible to simplify the transceivers between fiber and radio and then radically reduce the costs. Further advantages of analog RoF are lower latency, lower power and lower power consumption.

Although analog RoF in fronthaul is able to reduce latency and also to simplify radio head complexity, it suffers from cumulative effects of noise and device nonlinearities as well as crosstalk arising from impairments in the optical link.

Two key figures of merit of a fiber link are link gain and SFDR, which preferably should be kept as high as possible. Most prior art techniques leave most of the optical power in the baseband of the optical carrier, which makes it difficult to obtain a high SFDR.

In prior art "Performance Improvement in RoF Links Based on Optical Carrier Suppression using a Phase-Shifted FBG", Chen Xu et al., Proc. ACP 2013, paper ATh3G.3, optical carrier suppression is used to improve link gain and SFDR.

Embodiments herein further improve link performance for RoF transmission, for example for analog RoF transmission, by comprising an optical device adapted to suppress a multiple of optical carriers comprised in a transmitted optical signal, by means of very selective optical filtering provided by one or more phase shifted Bragg gratings, e.g. one or more Fiber Bragg Gratings (FBG), and further adapted to amplify the power of the optical signal from the one or more phase shifted Bragg gratings by means of optical amplification.

A Bragg grating reflects particular wavelengths and transmits all others. A phase-shifted Bragg grating is a special grating that differs from a standard Bragg grating by introducing a phase-shift at the centre of an otherwise periodic grating. This may be considered as dividing a Bragg grating into two separate smaller Bragg gratings forming a Fabry-Perot cavity between two mirrors. The result of adding an odd multiple of a $\pi$-phase-shift in the centre of a highly reflective Bragg grating is an extremely narrow notch in the centre of the reflection spectrum, resulting in a very narrow transmission band within its reflection band.

An FBG is a type of Bragg grating constructed in a short segment of optical fiber comprising a periodic variation in the refractive index of the fiber core.

While analog RoF seems very promising for fronthaul applications, advancements in technologies such as Wavelength Division Multiplexing (WDM), including wavelength re-use, and integrated photonics become enablers for cost-effective solutions in the area of fiber access networks. The concept of wavelength re-use may be applied to WDM Analog (a-RoF) solution for fronthaul, which together with carrier suppression techniques bring the best of the two worlds into one solution.

Subcarrier Multiplexing (SCM) is a technique able to multiplex many RF signals, subcarriers, to be carried by a single wavelength channel, and WDM is able to multiplex many such wavelength channels into a single fiber strand. The combination of WDM and SCM provides an efficient, potentially high-performance solution for mobile fronthaul, especially desired in scenarios with high-density of remote radio heads.

One application scenario for the described combination is fiber and/or fiber-extended Radio Dot System (RDS). In RDS the fiber reaches the radio head, also referred to as radio dot, directly or it reaches a so called copper-fiber converter, which further connects to the radio dot by copper cable.

The phase shifted Bragg grating enable suppression of an optical carrier in an SCM transmission system which requires high spectral selectivity. Embodiments herein improve the link gain by increasing the carrier to sideband ratio, i.e. the ratio of the power of the carrier to the power in the modulation signal, or in other words embodiments herein improve the link gain by increasing the carrier suppression ratio. For example, embodiments herein may improve the link gain with an amount equal to or larger than the carrier suppression ratio. Carrier suppression changes the ratio between the carrier and subcarrier power levels. However, since the overall wavelength channel power is reduced it also leaves margin for optical amplification while keeping the same total power at a following photodiode compared to a system without carrier suppression. At the end, the two factors contribute to improvements of the link gain and the SFDR without any changes of a transmitter comprised in the transceiver.

A further advantage with embodiments herein, as will be explained further below, is that thanks to the effect of the Bragg grating, i.e. notch filtering in reverse direction and narrow passband filtering in forward direction, two other functions may be provided: optical carrier extraction for wavelength re-use transmission schemes and extraction of a frequency reference signal—also referred to as a synchronisation signal—for synchronisation of mixing stages in the transceiver.

Since the discussed Bragg grating acts as a bandpass filter in the forward direction around the nominal wavelength of the optical carrier, it may also be used as an extractor of the frequency reference signal at a downstream receiver by placing an additional photodiode at a through-port of the Bragg grating or cascade of Bragg gratings after wavelength de-multiplexing. The passband of the Bragg grating may let through the optical carrier baseband and a subcarrier of the frequency reference signal, in this case. In a similar manner a clean optical carrier, i.e. an optical carrier with low residual power of subcarriers, may be extracted. The optical carrier may be further re-used as a seed for transmission in another direction.

FIG. 1 depicts a communications network 100 in which embodiments herein may be implemented. The communications network 100 may be a wireless communications network, for example a 3GPP network, such as an LTE, WCDMA or GSM network, or any other communications or data network.

The communications network 100 may comprise network nodes such as a first network node 101. The first network node 101 may for example be a central node or a base station. The base station may also be referred to as an RBS, a NodeB, an evolved Node B (eNB, eNode B), a base transceiver station (BTS), Access Point Base Station, base station router, or any other network unit capable of communicating with a mobile radio communications device, such as a user equipment 102.

The communications network 100 may further comprise a second network node 103, such as a remote radio head. The remote radio head may for example comprise RF-hardware for providing radio communication with a mobile radio communication device, such as the user equipment 102.

Each network node 101, 103 may comprise an optical transceiver 105, 106. Each optical transceiver 105, 106 may transmit optical signals over an optical transmission link 110 to another optical transceiver which may be comprised in another network node. The optical transmission link 110 enables communication between the network nodes, e.g. between the first network node 101 and the second network node 103. The transmission optical link 110 may for example be implemented with an optical cable.

The transmission over the optical transmission link 110 may be based on WDM. The WDM based transmission may further be combined with SCM. The optical transmission link 110 may for example be used for analog or digital fronthaul. Analog optical fronthaul may for example be based on Fiber-to-the-Radiohead and reach-extended Radio Dot System (RDS) solutions.

The optical transmission link 110 may be bi-directional, meaning that the same optical transmission link 110, e.g. the same optical fiber, is used for transmission of signals in both directions.

A combination of parts of the first network node 101, the second network node 103 and the optical transmission link 110 may together constitute a transmission system.

Each optical transceiver 105, 106 may comprise an optical device 111, 112 for filtering and amplifying a multiple of WDM signals. More specifically, the optical device 111, 112 may be comprised in or located in front of a receiver 121, 122, comprised in the transceiver. In other words, the WDM signals may pass through the optical device 111, 112 before reaching one or more photodetectors comprised in the receiver 121, 122. Placing the optical device 111, 112 in front of the receiver 121, 122 allows for full integration of the parts of the optical device 111, 112, and the level of backscattered WDM signals, e.g. from the optical transmission link 110, is low, since the amplification of the WDM signals is performed after the optical transmission link 110.

Each WDM signal comprises a respective optical carrier and a respective modulation signal. The respective modulation signal may comprise one or more sub-carriers. The sub-carriers may be sub-carriers in an SCM context.

In some example embodiments the respective modulation signal comprises a respective frequency reference signal.

Figure 2:
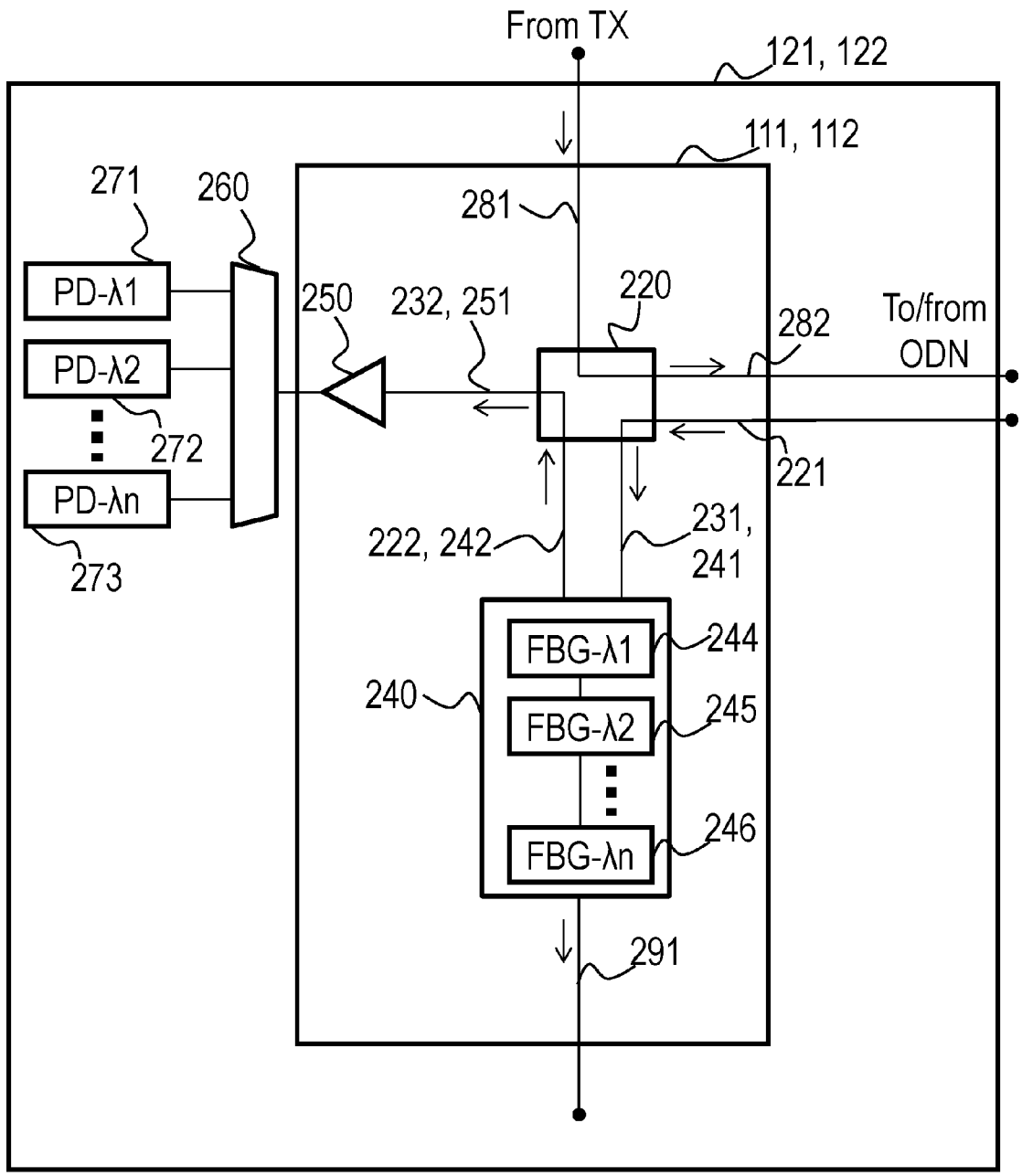
FIG. 2 is a schematic block diagram illustrating embodiments herein.

FIG. 2 depicts the optical transceiver 105, 106 and the optical device 111, 112 in greater detail. The optical device 111, 112 may be constructed in various materials and technologies. For example the optical device 111, 112 may be any one or more out of: a fiber device, semiconductor device, semiconductor-on-insulator device, a silica device and a glass device.

The optical device 111, 112 comprises an optical input and output device 220. The optical input and output device 220 comprises a first input port 221 to input the WDM signals, e.g. from the optical transmission link 110 into the optical device 111. The optical device 111, 112 further comprises a second input port 222, a first output port 231 and a second output port 232. The first input port 221 is coupled to the first output port 231, while the second input port 222 is coupled to the second output port 232.

The optical device 111, 112 further comprises an optical filtering device 240. The optical filtering device 240 may be an integrated optical filtering device.

The optical filtering device 240 comprises an input port 241 coupled to the first output port 231 comprised in the optical input and output device 220, to input the WDM signals into the optical filtering device 240. The optical filtering device 240 further comprises an output port 242 coupled to the second input port 222 comprised in the optical input and output device 220. The first input port 221 is coupled to the first output port 231, and the second input port 222 is coupled to the second output port 232. The output port 242 comprised in the optical filtering device 240 may be the same port as the input port 241 comprised in the optical filtering device 240. Thus, the output signal from the optical filtering device 240 may be a reflected WDM signal from the optical filtering device 240.

The optical filtering device 240 further comprises a multiple of cascaded phase shifted Bragg gratings 244, 245, 246. Each phase shifted Bragg grating may be phase shifted with an odd multiple of $\pi$.

The optical device 111, 112 further comprises an optical amplifying device 250. The optical amplifying device 250 comprises an input port 251 coupled to the second output port 232 comprised in the optical input and output device 220.

The optical input and output device 220 is adapted to couple the output port 242 comprised in the optical filtering device 240 to the input port 251 comprised in the optical amplifying device 250.

Each Bragg grating 244, 245, 246 is adapted to filter an associated respective optical carrier, e.g. $\lambda_1$, $\lambda_2$ and $\lambda_n$, within a filter bandwidth of the respective optical carrier, from the respective WDM signal. Each phase shifted Bragg grating 244, 245, 246 is adapted to produce a respective output signal to the optical amplifying device 250, for which respective output signal the respective optical carrier is suppressed relative to the respective modulation signal. For example, when the multiple of cascaded phase shifted Bragg gratings 244, 245, 246 are phase shifted with an odd multiple of $\pi$, the optical filtering device 240 is adapted to transmit the respective optical carrier and to reflect the respective modulation signal. Then the respective output signal comprises the reflected modulation signal and a suppressed optical carrier.

In some embodiments the multiple of cascaded phase shifted Bragg gratings 244, 245, 246 comprises a multiple of cascaded phase shifted FBGs.

The optical amplifying device 250 is adapted to amplify the respective output signal from the optical filtering device 240. The amplification together with carrier suppression increases the SFDR of the WDM signal and increases the link gain, i.e. the gain of the optical transmission link 110. Thereby the performance of the optical transmission link 110 is improved.

The optical transceiver 105, 106 may further be adapted to, e.g. by means of a de-multiplexer 260 adapted to, de-multiplex the output signals after amplification, i.e. the WDM signals after amplification. In some example embodiments, the optical transceiver 105, 106 is further adapted to, e.g. by means of an optoelectrical converter adapted to, convert the optical WDM signals, e.g. after de-multiplexing, into electrical signals. The optoelectrical converter may be implemented by one or more photodetectors 271, 272, 273. Each photodetector 271, 272, 273 may be adapted to convert a respective WDM signal with a respective optical carrier, e.g. $\lambda_1$, $\lambda_2$ and $\lambda_n$ as depicted in FIG. 2. The de-multiplexer 260 and the one or more photodetectors 271, 272, 273 may be comprised in the receiver 121, 122 comprised in the transceiver 105, 106.

When the optical transmission link 110 is bi-directional, the input and output device 220 further comprises a third input port 281 coupled to a third output port 282 to output outgoing WDM signals from a transmitter comprised in the optical transceiver 105, 106 into the optical transmission link 110. The outgoing WDM signals are for example sent from the second network node 103 to the first network node 101. In this way the optical device 111, 112 is compatible with bi-directional optical transmission links.

In some embodiments the optical filtering device 240 comprises a second output port 291 to output the respective WDM signal within a filter bandwidth. Then the output within the filter bandwidth comprises the optical carriers. If the respective frequency reference signal is within the filter bandwidth, then the output within the filter bandwidth also comprises the frequency reference signal.

The second output port 291 comprised in the optical filtering device 240 may provide optical carrier extraction for wavelength re-use transmission schemes and/or extraction of the frequency reference signal for synchronization of mixing stages.

Since the discussed multiple of cascaded phase shifted Bragg gratings 244, 245, 246 acts as bandpass filters in the forward direction around the nominal wavelength of the optical carrier, the optical filtering device 240 may be adapted to extract the frequency reference signal at a downstream receiver, such as the receiver 121, 122, e.g. by placing an additional photodiode at a through-port, e.g. at the second output port 291 comprised in the optical filtering device 240, after wavelength de-multiplexing. The optical filtering device 240 needs to let through the optical carrier baseband and a subcarrier of the frequency reference signal, in this case. In a similar manner the optical filtering device 240 may be adapted to extract a clean optical carrier, i.e. an optical carrier with low residual power of subcarriers. The optical carrier may be further re-used as a seed for transmission in another direction, e.g. in a counter direction.

Figure 3A:
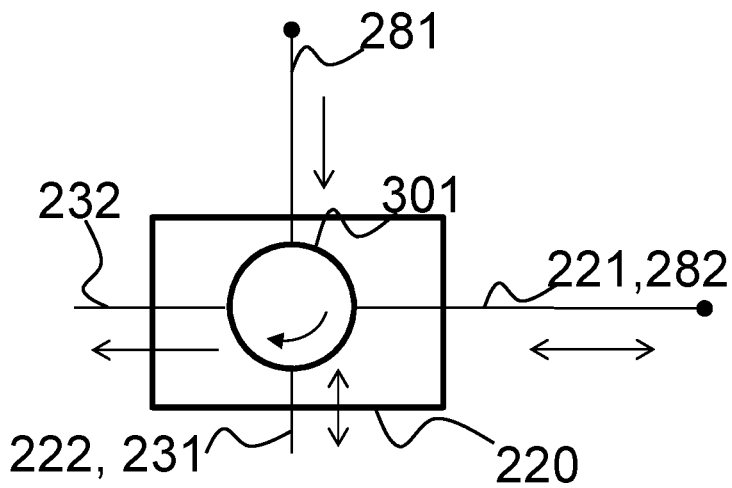
FIG. 3a is a schematic block diagram illustrating further embodiments herein.
Figure 3B:
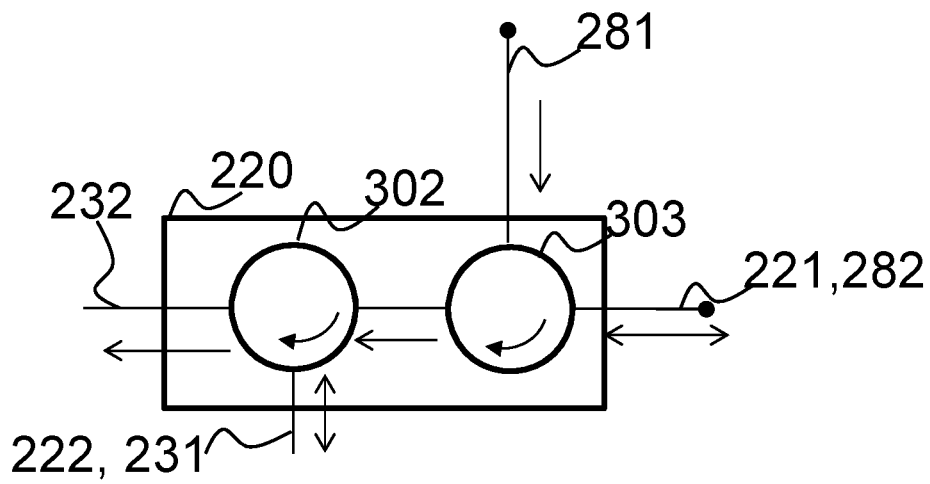
FIG. 3b is a schematic block diagram illustrating further embodiments herein.

In some example embodiments the input and output device 220 comprises one or more optical circulators 301, 302, 303 as depicted in FIG. 3a and FIG. 3b.

For example the input and output device 220 may comprise a four-port circulator 301. In some other embodiments the input and output device 220 comprises two three-port circulators 302, 303.

Embodiments herein make use of the multiple of cascaded phase shifted Bragg gratings 244, 245, 246 with each such Bragg grating 244, 245, 246 having its reflection band dedicated to a single optical carrier. Therefore, for a WDM system the number of required Bragg gratings may equal the number of wavelength channels.

In embodiments herein proper optical filter characteristics, such as the bandwidth of the passband, and a uniformity, or in other words a ripple, of the stopband are important. The former one is important to be narrow enough in order to avoid any impact on the modulation signals placed close to the baseband of the optical carrier. The latter one is important to be as flat as possible in order to keep the carrier sidebands, where e.g. the subcarriers are placed around the optical carrier, affected by minimum differential attenuation. A phase shifted Bragg grating enable a very narrow passband and a high uniformity of the stopband.

An advantage with embodiments herein is that the Bragg gratings may also act as a gain-flattened filter to secure negligible or no signal distortion resulting from interaction between optical channels unequal in power.

The insertion loss introduced in non-reflective regions, i.e. for adjacent optical carriers, may be considered as negligible, i.e. much below 0.5 dB. However, while the number of optical carriers and related Bragg gratings increases, some optical carriers may experience unacceptable accumulated loss. Therefore, some embodiments may comprise an advanced Bragg grating structure with multiple reflection bands, e.g. achieved through gratings with aperiodic index modulation. Or in other words, the multiple of cascaded phase shifted Bragg gratings 244, 245, 246 may comprise an aperiodic index modulation. The loss characteristics of such a structure may be designed as a gain-flattened filter, which prevents from destructive interactions between optical wavelength channels within the following optical amplifier by equalizing the input power across optical channels. In other words, each phase shifted Bragg grating 244, 245, 246 may be individually designed to have a filter characteristic that counteracts any difference in optical power between the WDM signals. Such difference in optical power may arise for example from the transmission through the optical transmission link 110 or through any optical component such as the optical device 111, 112.

Suppressed carrier SCM transmission together with optical amplification provides an increased link gain, or in other words increased power budget, and better link performance, such as higher SFDR, compared to conventional optical SCM, i.e. without carrier suppression. Embodiments herein are applicable to both upstream and downstream transceivers.

Moreover, the application of photonic integration may enable cost-effective implementation of complex photonic structures, e.g. the one or more optical circulators 301, 302, 303 and the multiple of cascaded phase shifted Bragg gratings 244, 245, 246 integrated in one optical device.

Further scientific advancements in optical integration technologies may enable complete integration of the optical device 111, 112.

Another advantage with embodiments herein is that the level of backscattered or back-reflected WDM signals, e.g. from the optical transmission link 110, is low, since the amplification of the WDM signal is performed after the optical transmission link 110, i.e. in front of the photodetectors 271, 272, 273. Backscattered or back-reflected WDM signals may increase cross-talk for wavelength re-use schemes, i.e. when an optical carrier is re-used.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope, which is defined by the appending claims.

The invention claimed is:

1. An optical device for filtering and amplifying a multiple of Wavelength Division Multiplexed (WDM) signals in an optical transmission link in a communications network, each WDM signal comprises a respective optical carrier and a respective modulation signal, wherein the optical device comprises:

an optical input and output device comprising a first input port to input the WDM signals from the optical transmission link into the optical device, and further comprising a second input port, a first output port and a second output port, wherein the first input port is coupled to the first output port, and the second input port is coupled to the second output port;

an optical filtering device comprising an input port coupled to the first output port comprised in the optical input and output device to input the WDM signals, and an output port coupled to the second input port comprised in the optical input and output device; and an optical amplifying device comprising an input port coupled to the second output port comprised in the optical input and output device, wherein the optical filtering device comprises a multiple of cascaded phase shifted Bragg gratings, each Bragg grating being adapted to filter an associated respective optical carrier, from the respective WDM signal to produce a respective output signal to the optical amplifying device, for which respective output signal the respective optical carrier is suppressed relative to the respective modulation signal.

2. The optical device according to claim 1, wherein the respective modulation signal comprises one or more subcarriers.

3. The optical device according to claim 1, wherein the multiple of cascaded phase shifted Bragg gratings comprises a multiple of cascaded phase shifted Fiber Bragg Gratings, FBGs.

4. The optical device according to claim 1, wherein the optical transmission link is bi-directional and wherein the input and output device further comprises a third input port coupled to a third output port to output outgoing WDM signals from a transmitter into the optical transmission link.

5. The optical device according to claim 1, wherein the input and output device comprises one or more optical circulators.

6. The optical device according to claim 5, wherein the input and output device comprises a four-port circulator.

7. The optical device according to claim 5, wherein the input and output device comprises two three-port circulators.

8. The optical device according to claim 1, wherein the optical filtering device comprises a second output port to output the respective WDM signal within a filter bandwidth of the respective optical carrier.

9. The optical device according to claim 1, wherein the multiple of cascaded phase shifted Bragg gratings comprises an aperiodic index modulation.

10. The optical device according to claim 1, wherein the respective modulation signal comprises a respective frequency reference signal, which is within the filter bandwidth.

11. The optical device according to claim 1, wherein the optical device is any one or more out of: a fiber device, semiconductor device, semiconductor-on-insulator device, a silica device and a glass device.

12. The optical device according to claim 1, wherein the optical filtering device is an integrated optical filtering device.

13. An optical transceiver comprising the optical device according to claim 1.

14. An optical receiver comprising the optical device according to claim 1.

15. A network node comprising the optical transceiver according to claim 13.

* * * * *